March 14, 1939. R. C. OLTMAN 2,150,864
HEARTH BREAD PAN
Filed April 23, 1937 3 Sheets-Sheet 1

Inventor
Ray C. Oltman
By Stanley Hordy
Att'y.

March 14, 1939.  R. C. OLTMAN  2,150,864
HEARTH BREAD PAN
Filed April 23, 1937  3 Sheets-Sheet 2
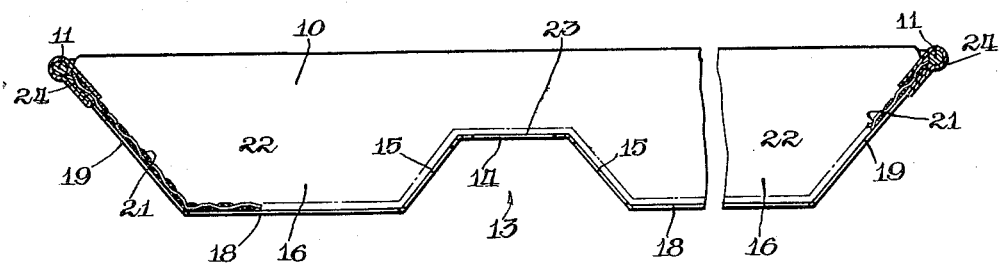
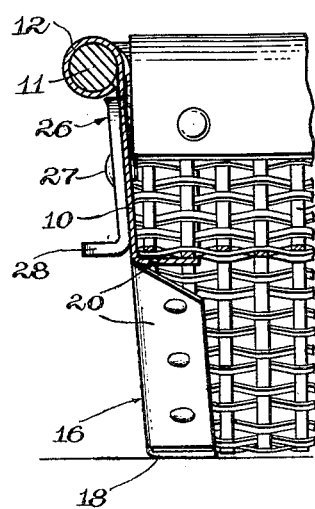
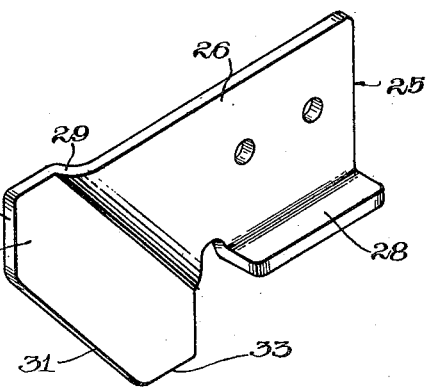
Inventor
Ray C. Oltman.
By Hauley Hood
Att'y.

March 14, 1939. R. C. OLTMAN 2,150,864
HEARTH BREAD PAN
Filed April 23, 1937 3 Sheets-Sheet 3
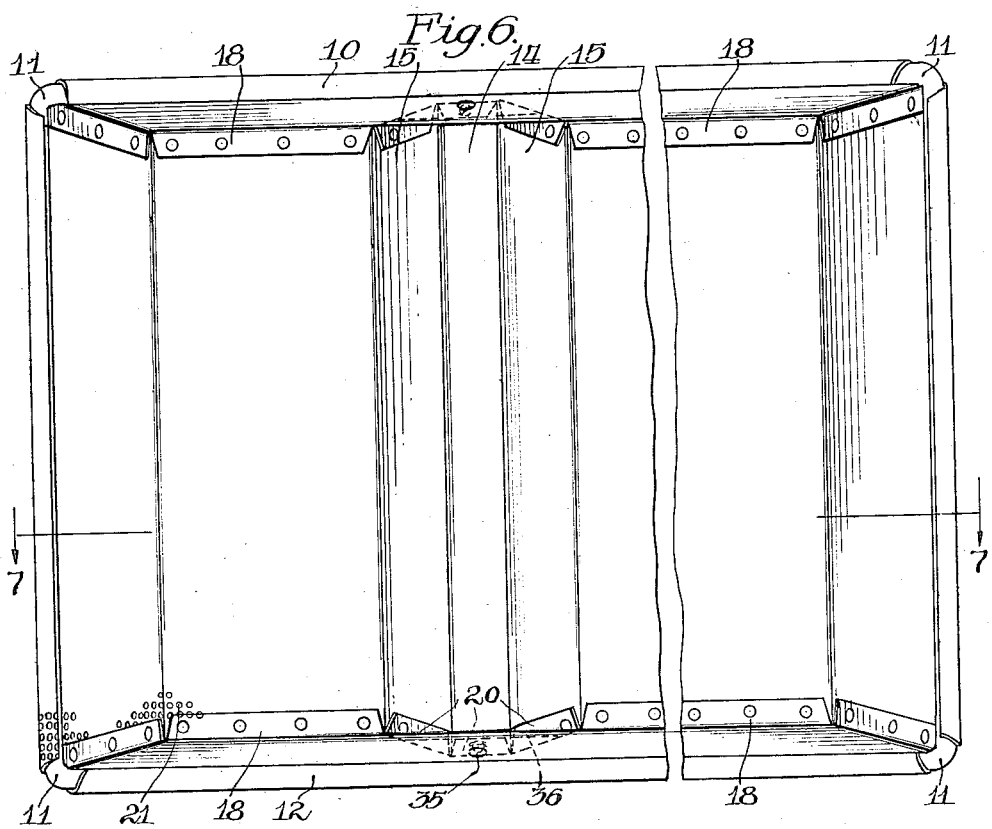
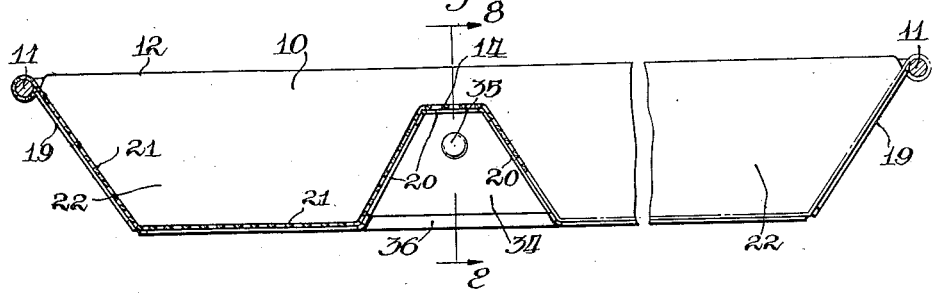
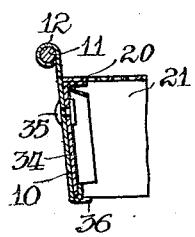
Inventor
Ray C. Oltman
By Stanley Hoods
Att'y.

Patented Mar. 14, 1939

2,150,864

UNITED STATES PATENT OFFICE 2,150,864

HEARTH BREAD PAN

Ray C. Oltman, Pasadena, Calif., assignor to The Edward Katzinger Company, Chicago, Ill., a corporation of Illinois Application April 23, 1937, Serial No. 138,541

8 Claims. (Cl. 53—6)

This invention relates to pans for the baking of hearth bread and is designed to provide for the baking of two or more loaves of such bread without permitting the loaves to contact with the hearth of the oven but at the same time permitting the free circulation of the heated air under and upon the sides of the loaves within the pan. Among its other objects the present invention also has in view means whereby a plurality of such pans may be stacked by nesting one into the other, maintaining the walls and elements thereof in spaced relation.

With the above and other objects in view, as will be apparent, this invention consists in the construction, combination and arrangement of parts, all as hereinafter more fully described, claimed and illustrated in the accompanying drawings, wherein:

Fig. 3 is a longitudinal section taken along line 3—3 of Fig. 1 and shows the creation of the several loaf receiving compartments of the pan;

Fig. 4 is a transverse section taken along line 4—4 of Fig. 1 to illustrate the means whereby the bottom of the pan is secured to the side walls thereof;

Fig. 5 is a perspective view of the nesting member or lug located at each corner of the pan;

Fig. 6 is a bottom plan view of a modified form of the present invention;

Fig. 7 is a vertical section taken along line 7—7 of Fig. 6; and

Fig. 8 is a vertical section taken along line 8—8 of Fig. 7 to illustrate cooperation between the pan side wall and the flanged plate mounted thereon.

Figure 1:
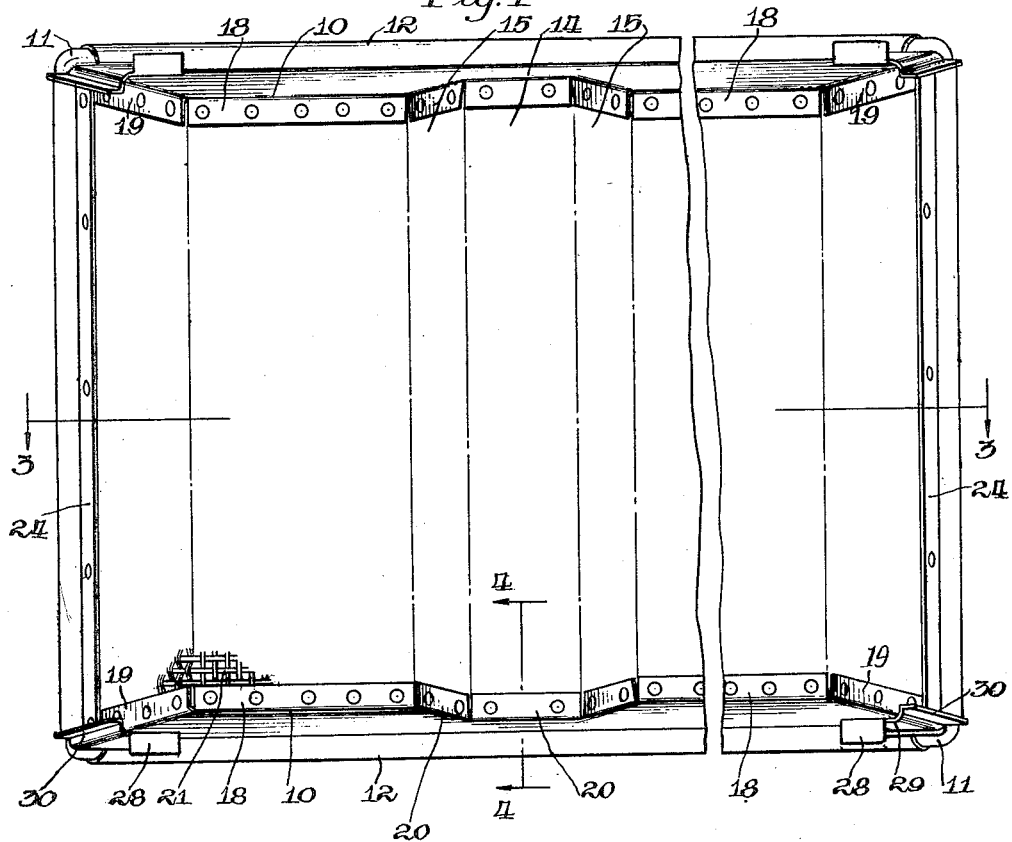
Fig. 1 is a bottom plan view of the preferred form of the present invention.

As is well-known hearth or crust bread, such as rye or vienna bread, usually comes in an elliptical or oval loaf, the widest part of the loaf being the transverse center thereof from which point the loaf tapers toward its ends, which are relatively small. Heretofore, it has been customary to place the formed dough masses directly upon the hearth or floor of the oven whereby this type of bread derives its name "hearth bread".

It has been found desirable to support such loaves above the oven hearth for sanitary reasons, and also that it is more efficient to handle several loaves at one time rather than to individually handle each individual loaf both in placing it in the oven and removing it from the oven.

Therefore, the present invention has in view the construction of a baking pan in which two or more loaves may be baked and handled for insertion into the oven and removal therefrom, supporting the loaves above the oven hearth. At the same time the present invention contemplates a complete, free and uninterrupted circulation of the heated air of the oven under, over and around all surfaces of the loaf or loaves within the pan. In this manner the loaves may be efficiently handled in groups in a sanitary manner and the resulting bread will have all of the features and characteristics of bread baked directly on the hearth or floor of the oven.

When baking pans of this and other types are not in use, it is customary to stack them by nesting one pan within the other. It is desirable to space the walls and bottoms of the pans so nested one from the other to permit air circulation around and between the pans to facilitate the cooling thereof. The present invention consequently also contemplates baking pans of the character above described which may be stacked by nesting one into the other with the walls thereof spaced to permit air circulation therebetween and so that relative movement between the pans of the stack may be prevented.

Reference being had more particularly to the drawings, 10 designates the longitudinal side walls of the present pan. A rectangular wire frame 11 is designed to surround the pan and the longitudinal sides of this frame 11 rest adjacent the upper edges of the longitudinal side walls 10 of the pan and bear against the exterior surfaces thereof. The upper longitudinal edges of the side walls 10 of the pan are each provided with a flange 12 which is bent outwardly, downwardly and inwardly to embrace and engage the adjoining longitudinal side of the rectangular wire frame 11 thereby securing said side walls 10 rigidly to the frame 11.

The lower longitudinal edge of each side wall 10 is provided with the recesses 13 spaced one from the other longitudinally of the side wall and the recesses 13 of one side wall 10 are aligned transversely of the pan with the corresponding similar recesses 13 of the other side wall 10.

The base 14 of each recess 13 is substantially parallel to the outstanding bead at the upper longitudinal edge of the side wall 10 created by the wire frame 11 and the flanges 12, and is spaced therefrom. The sides 15 of each recess 13 converge upwardly from the lower longitudinal edges of the side wall 10 and toward the base 14 thereof. By the provision of the recesses 13 each side wall 10 is divided into a plurality of sections 16 each of which constitutes the end wall of a loaf receiving compartment located within the pan. The end edges 17 of each side wall converge inwardly and downwardly and lie in planes substantially parallel to the planes of certain of the sides of the recesses 13. Thus, one end edge 17 of a side wall 10 lies in a plane substantially parallel to the planes of the corresponding sides 15 of the recesses 13, while the opposite end edge 17 of the side wall 10 lies in a plane substantially parallel to the corresponding and oppositely disposed sides 15 of the recesses 13.

The lower longitudinal edges of the sections 16 of the side walls are provided with flanges 18 which are disposed at right angles to the section and extend inwardly of the pan. The end edges of the side walls are also provided with similarly formed and positioned flanges 19, while the bases 14 and the sides 15 of each recess 13 are provided with a similarly formed and situated flange 20. It is to be noted that the side walls 10, and all elements thereof, are formed of solid sheet metal and are not shown as being provided with apertures or perforations though perforations may be provided therein if so desired.

The bottom 21 of the pan consists of foraminated metallic sheet, either in the form of wire cloth or gauze or in the form of a metallic sheet provided with closely situated perforations. This sheet is positioned between the side walls 10 of the pan and is bent so that the longitudinal edges thereof rest flush against the inner surfaces of the flanges 18, 19, and 20, respectively, formed on the lower edges of sections 16 of the side wall, the end edges 17 of the side walls 10 and the bottom 14 and sides 15 of the recesses 13. Thus, the bottom 21 of the pan follows the outline of the lower longitudinal edges of the side walls 10, thus creating a plurality of parallel baking compartments 22 in which the loaves are received. These pockets are separated by the ridges or elevated portions 23 of the bottom formed by the provision of the recesses 13 in the lower longitudinal edges of the side walls 10. Each of these ridges or elevated portions being formed of the same foraminated metal as the bottom 21, not only permits the ready circulation of the heated air of the oven therethrough, but also provides a substantial and effective separation between the compartments 22 of the pan. The longitudinal edges of the bottom 21 resting flush upon the flanges 18, 19 and 20 are secured to these flanges in any suitable manner, such as for example by the use of rivets or by spot welding.

The transverse end edges of the bottom 21 are bent outwardly and downwardly to encircle the ends of the rectangular wire frame 11 extending between the ends 17 of the upper edges of the side walls 10 of the pan. While these ends of the bottom 21 engaging the ends of the frame 11 may be exposed, they may be covered and secured to the wire frame in any suitable manner. As an example of this a U-shaped metallic plate 24 is placed over and embraces the opposed sides of the end portions of the bottom 21 and the bead formed by the end edges of the bottom encircling the ends of the frame 11 thereby forming a continuing bead of the beads on the upper longitudinal edges of the side walls 10. This metallic plate 24 is bent to rest flush against the inner and outer surfaces of the end portion of the bottom 21 and to closely follow the exterior contour of the frame 11 where the ends of the bottom 21 embrace and encircle it and be there held by any suitable means, such as by rivets or by spot welding.

In order to provide for the nesting of one pan set into another to create a stack wherein the various elements of the pans in the stack are separated one from the other, a nesting lug 25 is provided at each corner of the pan set and is secured to the exterior surfaces of the side walls 10 thereof adjacent the upper corner of the set. This lug consists of a plate 26 attached to the side wall 10 by the rivets 27. The upper longitudinal edge of this plate 26 rests directly against the adjoining edge portions of the side wall flange 12 encircling the sides of the frame 11 and this position of the upper longitudinal edge of the plate 26 is such that it will prevent the adjoining portion of the flange 12 from becoming disengaged from the longitudinal side in the wire frame 11. The lower longitudinal edge of the plate 26 is provided with an ear 28 projecting outwardly at right angles to the body of the plate 26. The outer transverse edge of the plate 26 is bent inwardly, as at 29, to rest flush against the adjoining end edge 17 of the side wall 10 and to create an end ear 30 on said plate which projects beyond the end edge 17 of the side wall. The major portion of the outer edge 31 of the end ear 30 of the lug is parallel to the corresponding and adjacent end edge 17 of the side wall 10, and the upper portion 32 of the outer edge of such ear is substantially perpendicular while the lower edge 33 thereof is substantially horizontal or lying in a plane parallel to the plane of the flanges 18 on the wall sections 16.

There is one of these nesting lugs 25 at each corner of the pan and when one pan is nested into another pan the ears 28 of the lugs of the upper pan rest upon the outstanding beads of the subjacent pan to prevent a complete nesting of the pans and the lower portions of the end ears 30 of the lugs 25 enter the outer corners of the subjacent pan with the edge portions 31 thereof resting against the inner surfaces of the end walls of the subjacent pan adjoining the frame 11 and the corners of the pan.

It is manifest that if there is any tendency of the pans of the stack to move relatively, longitudinally of the pans, the edge portions 31 of the ears 30 will contact against the inner surfaces of the end walls of the subjacent pan and prevent such movement; and that if there is a tendency of the pans in the stack to move relatively transversely of the pans, those portions of the end ears 30 of the lugs 25 projecting into the subjacent pans will contact with the inner surfaces of the side walls 10 of the subjacent pans adjoining the corners of said pans and will prevent this movement. Thus, the ears 30 of the nesting lugs 25 prevent any undue relative movement of the pans in a stack either longitudinally or transversely of the pans, while the ears 28 of the nesting lugs 25 create a nesting line by their contact with the beads of the subjacent pan.

Figure 2:
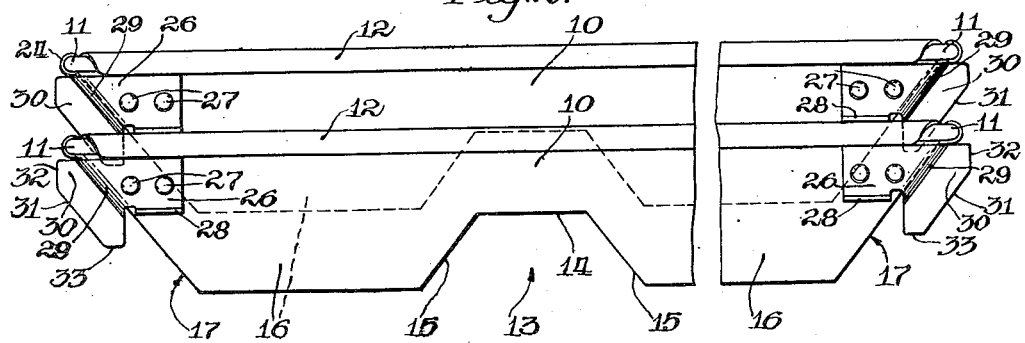
Fig. 2 is a side elevation of two pans constructed in accordance with the present invention illustrating the same nested one within the other.

The modified form of the present invention illustrated in Figs. 6 and 7 is similar to that form of the invention illustrated in Figs. 1 to 4 inclusive, except that the recesses 13 are not provided in the side walls of the set. In order to provide the flanges 20 in the set shown in Figs. 6 and 7, defining the limits of the ridges or elevated portions 23 of the bottom 21, a generally triangular plate 34 having the flanges 20 formed thereon is placed against the inner surfaces of the side walls 10 at each point where it is desired to have a ridge or elevated portion 23 of the bottom 21. This plate 34 is secured to the side wall 10 by a rivet or other suitable fastening means 35 and the lower edge 36 of the side wall 10 is bent inwardly and upwardly to embrace the lower edge of the plate 34. In other words, in that form of the invention shown in Figs. 6 and 7, the lower edge of the side wall is initially provided with a plurality of flanges 18 and 36. The alternate flanges 36 instead of resting horizontally as do the flanges 18 at the lower edges of the wall sections 16, are bent inwardly and upwardly to rest parallel to the side wall 10 and engage and bear over the lower edges of the plates 34.

Dough masses placed in the compartments 22 of the pan are supported by the foraminated bottom 21 above the hearth of the oven so that the heated air of the oven may as freely circulate about said dough masses as if the dough masses were directly placed upon the hearth. Consequently, hearth or crust bread is produced in this pan as successfully and efficiently as by any method heretofore employed and under sanitary and efficient conditions.

What is claimed is:

1. A baking pan consisting of sheet metal side walls, having angularly disposed end edges and spaced recesses in the lower edges thereof, the base of each recess being horizontal with the sides of said recess converging to the ends of the base, inwardly projecting flanges formed on said side walls along the lower longitudinal edges thereof, including the sides and bases of said recesses and at the angularly disposed end edges of the side walls, and a foraminated bottom interposed between said side walls and bent to rest, at its edges, flush against said inwardly projecting flanges thereby creating a series of spaced elevations in said bottom and end walls of said pan.

2. A hearth bread pan consisting of opposed sheet metal walls for restricting endwise expansion of the contents thereof, and a foraminated bottom interposed between the lower extremities of said walls, said bottom having an elevated portion to create an upwardly and outwardly sloping wall between said first walls, said elevated portion having its upper limits lying in a plane substantially below the plane of the upper longitudinal edges of the first mentioned walls.

3. A multiple unit hearth bread baking pan set having adjacent compartments, each compartment having a foraminated bottom and walls separating adjacent compartments, said bottom being elevated to create upwardly and outwardly sloping walls at the outer ends of the set, and connections between the edges of said bottom and walls including spaced end members projecting above the upper limits of the adjacent walls of adjacent compartments.

4. A multiple unit hearth bread baking pan set having adjacent compartments, each compartment having a foraminated bottom and walls separating adjacent compartments, said bottom being elevated to create upwardly and outwardly sloping walls at the outer ends of the set, connections between the edges of said bottom and walls including spaced end members projecting above the upper limits of the adjacent walls of adjacent compartments, and a frame secured to the upper edges of said spaced end members and having portions interposed between the extremities of said end members, said outwardly sloping outer walls having an outer edge secured to said frame portion.

5. A hearth bread pan consisting of sheet metal side walls, a triangular plate secured against the inner surface of one of said walls at uniformly spaced intervals longitudinally of said wall and aligned transversely of the pan with corresponding plates on the opposite wall, each of said plates having their bottom edge in alignment with the bottom edge of the associated wall, flanges projecting inwardly from the lower edges of said walls to engage and bear over against the bottom edge of said plates, flanges projecting inwardly from the side and top edges of said plate, and a foraminated bottom interposed between said side walls and resting on said flanges.

6. A baking pan consisting of a pair of spaced sheet metal side walls, a wire frame secured to the upper edges of the said side walls and having end portions interposed between the ends of said side walls, each of said side walls having spaced recesses in the lower longitudinal edge thereof, the recesses of one of said side walls being aligned transversely of the pan with the recesses of the other side wall, flanges projecting inwardly from the end and lower longitudinal edges of said side walls, including the edges of said recesses, and a foraminated bottom interposed between said side walls and bent so that its longitudinal edges rest flush upon all of said flanges, the ends of said bottom being bent outwardly and downwardly about the portions of said frame interposed between the ends of the side walls, and a U-shaped plate resting flush against and secured to the inner and outer surfaces of the end portion of the bottom to closely follow the contour of the frame where the ends of the bottom embrace and encircle the said frame.

7. A hearth bread pan consisting of opposed sheet metal walls for restricting endwise expansion of the contents thereof, each of said walls having a series of spaced recesses in one edge thereof, the recesses of each of said walls aligning transversely of the pan with the recesses of the opposed wall, flanges projecting inwardly from the lower edges of said walls including the edges of said recesses, a foraminated bottom interposed between said walls and bent to rest flush on said flanges to create upwardly and outwardly sloping walls between said first walls, said elevated portion having its upper limits lying in a plane substantially below the top edge of the first mentioned walls.

8. A hearth bread pan consisting of a pair of opposed sheet metal walls for restricting endwise expansion of the contents thereof, a wire frame secured to the upper edges of said walls and having end portions interposed between the ends of said walls, each of said walls having spaced recesses in the lower longitudinal edge thereof, the recesses of one of said walls being aligned transversely of the pan with the recesses of the other wall, flanges projecting inwardly from the end and lower longitudinal edges of said walls including the edges of said recesses, a foraminated bottom interposed between said walls and bent so that its longitudinal edges rest flush upon all of said flanges to create upwardly and outwardly sloping walls between said first walls, said elevated portion having its upper limits lying in a plane substantially below the plane of the upper longitudinal edges of the first mentioned walls, the ends of said bottom being bent outwardly and downwardly about the portions of said frame interposed between the ends of the first mentioned walls.

RAY C. OLTMAN.